United States Patent [19]

Rosaen

[11] 4,307,405

[45] Dec. 22, 1981

[54] FLOW METER RECORDING DEVICE

[76] Inventor: Nils O. Rosaen, 1755 E. Nine Mile, Hazel Park, Mich. 48030

[21] Appl. No.: 133,621

[22] Filed: Mar. 24, 1980

[51] Int. Cl.³ .................... G01D 9/00; G01D 15/16; G01D 15/24
[52] U.S. Cl. ........................... 346/36; 346/68; 346/121; 346/137
[58] Field of Search ............... 346/36, 42, 68, 121, 346/124, 137; 137/556

[56] References Cited

U.S. PATENT DOCUMENTS

| | | | |
|---|---|---|---|
| 1,181,037 | 4/1916 | Rickert et al. | 346/36 |
| 1,514,524 | 11/1924 | Hodgkinson | 346/68 |
| 1,681,174 | 8/1928 | Diehl | 346/137 X |
| 2,557,007 | 6/1951 | Paulsen | 346/36 |

FOREIGN PATENT DOCUMENTS 1278341  6/1972  United Kingdom ............... 346/137

*Primary Examiner*—George H. Miller, Jr.
*Attorney, Agent, or Firm*—Gifford, VanOphem, Sheridan & Sprinkle

[57] ABSTRACT

A device for recording the flow rate through a flow meter over a period of time is provided for use in conjunction with a flow meter having a rotatable member, the rotational position of which is indicative of the fluid flow rate through the flow meter. The recording device comprises a housing in which a recording medium is mounted and rotatably driven at a predetermined rate. An elongated scribe arm is pivotally secured at one end to the housing and, at its other end, has a writing instrument which engages the writing medium and produces a visible mark thereon. Similarly, an elongated actuating arm has an axle which is pivotally mounted to the housing and this axle in turn is connected to the flow meter rotatable member. The actuating arm and scribe arm are in turn connected together by a connecting arm which is pivotally connected to the actuating arm at one end and pivotally connected to the scribe arm at its other end. Moreover, the pivotal connection between the connecting arm and both the scribe arm and the actuating arm are radially spaced from their respective pivotal mounting points so that pivotal movement of the actuating arm causes a like and proportional pivotal action of the scribe arm.

11 Claims, 6 Drawing Figures

FLOW METER RECORDING DEVICE

BACKGROUND OF THE INVENTION

I. Field of the Invention

The present invention relates generally to recording devices and, more particularly, to a recording device adapted for connection with a fluid flow meter and which produces a visible record of the flow rate through the flow meter over a period of time.

II. Description of the Prior Art

Several types of fluid flow meter, such as a vane fluid flow meter, include a rotatable shaft of the rotational position of which is indicative of the flow rate through the flow meter. Conventionally, this shaft is directly connected to an indicator needle which swings across a scale in unison with the rotation of the flow meter rotatable member. The scale includes suitable indicia which correlates the rotation position of the flow meter rotatable member, and hence the position of the indicator needle, with the flow rate through the flow meter so that the fluid flow rate through the flow meter can be visually determined exteriorly of the flow meter.

These previously known flow meters, however, have not included means for recording the flow rate through the flow meter over a prolonged period of time. Thus, transient fluctuations and long term variations of the fluid flow rate through the flow meter will be missed entirely unless the fluid flow meter is viewed continually. Continual viewing of the fluid flow meter, however, is an impractical and expensive solution for detecting transient fluctuations or long term variations in the fluid flow rate through the flow meter.

There have, however, been a number of previously known recording devices for recording the fluid flow rate through a flow meter. These previously known devices, however, are not only expensive in construction but also delicate in operation and thus unsuitable for industrial purposes.

SUMMARY OF THE PRESENT INVENTION

The present invention overcomes the above mentioned disadvantages of the previously known devices but providing a device for recording the fluid flow rate through a flow meter over a period of time and which is inexpensive and of a durable construction.

In brief, the recording device according to the present invention comprises a housing which is secured to the fluid flow meter. A suitable recording medium, such as a circular sheet of paper, is mounted to the housing and rotatably driven at a constant rate. Any suitable means, such as a simple and inexpensive clock mechanism, can be employed to rotatably drive the recording medium.

An elongated scribe arm is pivotally connected at one end to the housing and, at its other end, includes a writing instrument which engages and produces a visible mark on the writing medium. Moreover, the length of the scribe arm and its pivotal connection with the housing is selected so that as the scribe arm pivots, the writing instrument is moved substantially radially across the writing medium. Thus, the radial position of the visible mark on the writing medium caused by the writing instrument is proportional to the pivotal position of the scribe arm.

The recording device further comprises an actuating arm secured to an axle which in turn is rotatably mounted to the housing. The actuating arm axle is connected by any suitable means to the flow meter rotatable member so that the rotational position of the actuating arm is proportional to the rotational position of the flow meter rotatable member.

The actuating arm and scribe arm are connected together by means of an elongated connecting arm pivotally secured at one end to the actuating arm and at its other end pivotally secured to the scribe arm. Moreover, the pivotal connection of the connecting arm with both the actuating and scribe arms is radially spaced from their respective pivotal connections with the housing so that pivoting of the actuating arm causes a like and proportional pivoting of the scribe arm thus radially displacing the writing instrument across the writing medium.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
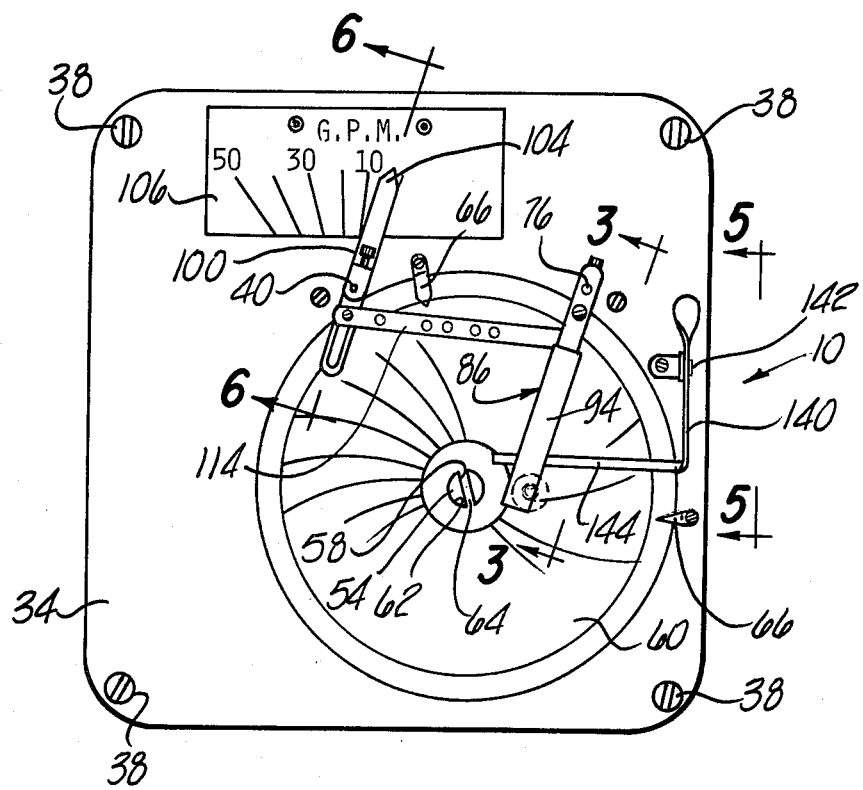
FIG. 1 is a front plan view illustrating the recording device according to the present invention.
Figure 2:
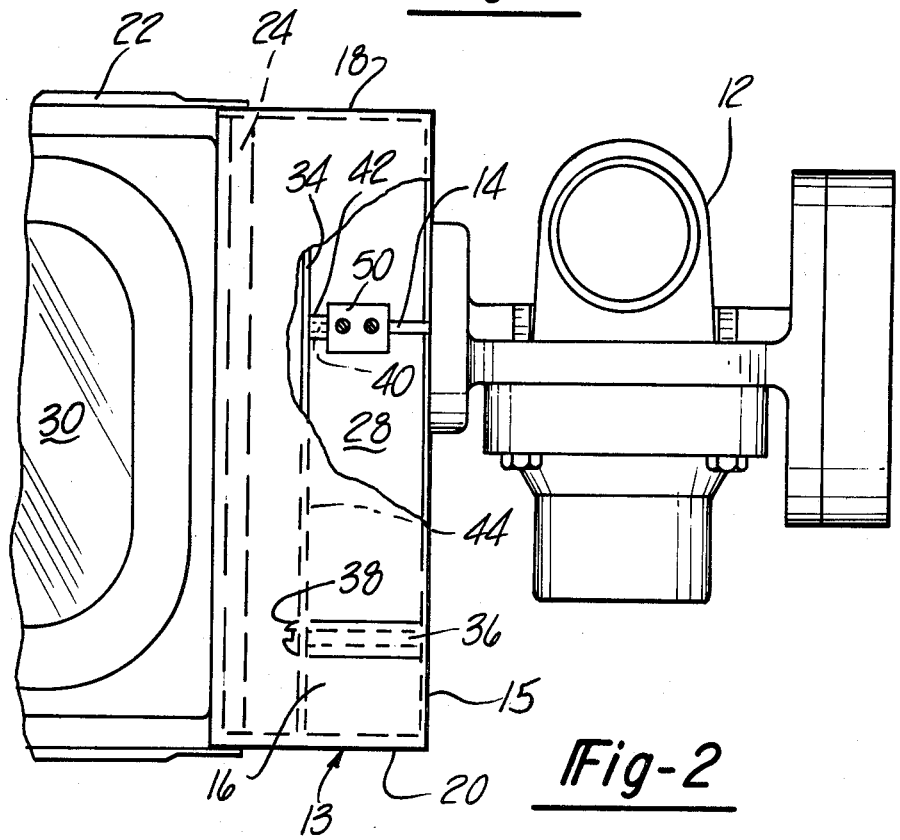
FIG. 2 is a fragmentary side view illustrating the recording device according to the present invention and its connection with a fluid flow meter.

With reference first to FIGS. 1 and 2, the recording device 10 according to the present invention is thereshown for use with a flow meter 12 having a rotatable member 14 the rotational position of which is indicative of the fluid flow rate through the flow meter 12. As illustrated, the flow meter 12 is a vane type flow meter of the type more fully described in U.S. Pat. No. 3,776,037 which issued on Dec. 4, 1973. The flow meter 12, however, forms no part of the instant invention and, for that reason, will not be further described.

Still referring to FIGS. 1 and 2, the recording device 10 further comprises a housing 13 having a back wall 15, side walls 16 (only one shown) and top and bottom walls 18 and 20, respectively. The front of the housing 13, moreover, can be closed by a door 22 (shown in FIG. 2 in an open position) which is pivotally secured to one side wall 16 of the housing 13 by a hinge 24. The back wall 15 of the housing 13 is secured to the flow meter 12. Latch members (not shown) are provided around the housing 13 to retain the door 22 in its closed position when desired. Moreover, with the door 22 in its closed position, the door in conjunction with the housing defines an interior chamber 28 which is generally rectangular in cross section. A window 30 on the door 22, however, permits the interior chamber 28 to be viewed exteriorly of the housing 13 even when the door 22 is shut.

Figure 6:
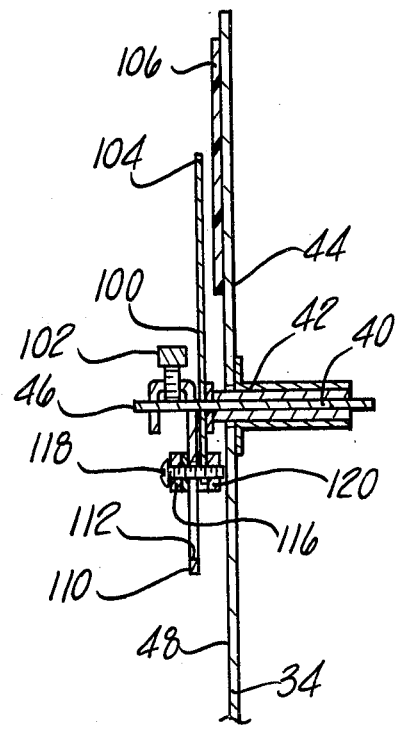
FIG. 6 is a fragmentary sectional view taken substantially along line 6—6 in FIG. 1 and enlarged for clarity.

Referring to FIGS. 1, 2 and 6, the recording device further comprises a generally rectangular plate 34 secured to the back wall 15 of the housing by bosses 36 and screws 38 so that the plate 34 lies in a plane generally parallel to the door 22 when closed. As is best shown in FIG. 6, a shaft 40 is rotatably mounted in a bearing assembly 42 secured to the rear face 44 of the plate 34 so that the shaft 40 has a portion 46 which protrudes outwardly from the front face 48 of the plate 34. The opposite end of the shaft 40 is secured to the flow meter rotatable member 14 by means of a collar 50 (FIG. 2) so that the shaft 40 rotates or pivots in unison with the flow meter rotatable member 14.

Figure 5:
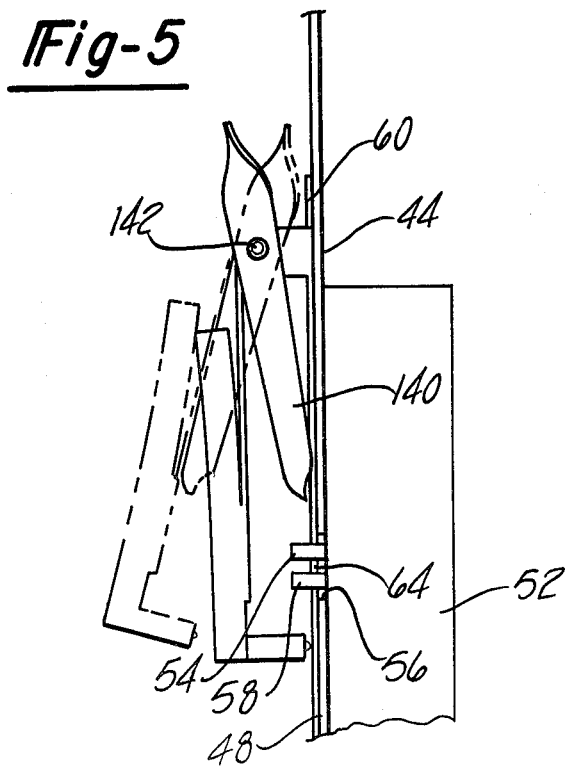
FIG. 5 is a fragmentary view taken along line 5—5 in FIG. 1 and enlarged for clarity.

Referring now to FIGS. 1 and 5, a motor assembly 52 having an output shaft 54 is secured by any suitable means to the rear face 44 of the plate 34 and so that the shaft 54 protrudes outwardly from the front face 48 through an aperture 56 in the plate 34. The motor 52 may be of any conventional construction but, in the preferred form of the invention, is a spring wound motor which rotatably drives its output shaft 54 at a constant rate, for example, one revolution per day.

The output shaft 54 from the motor 52 includes a transverse slot 58. A circular sheet of paper 60, or other suitable writing medium, includes a pair of central half-moon shaped aperture 62 which fit over the motor output shaft 54 and so that a portion 64 of the paper sheet 60 is positioned within the shaft slot 58. By this construction, rotation of the shaft 54 in turn rotatably drives the paper sheet 60. A pair of holddown members 66 (FIG. 1) are also preferably secured to the plate 34 and extend slightly over the outer edge of the paper sheet 60 in order to maintain the sheet 60 flat against the plate 34.

Figure 3:
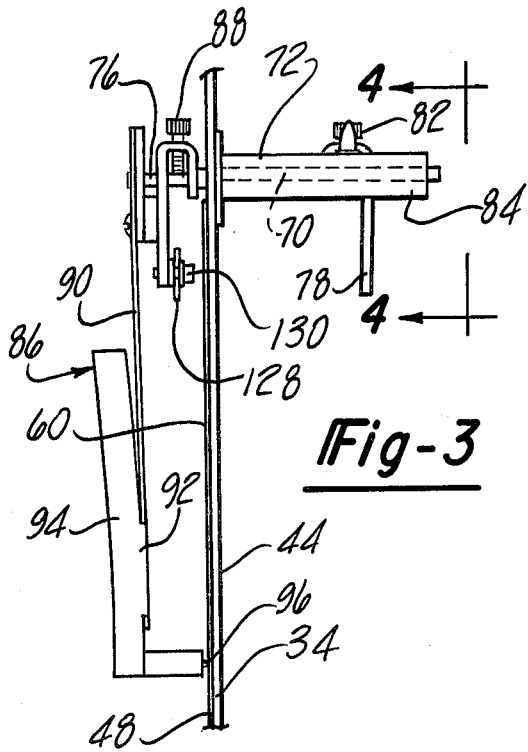
FIG. 3 is a fragmentary view taken substantially along line 3—3 in FIG. 1 with parts removed and enlarged for clarity.
Figure 4:
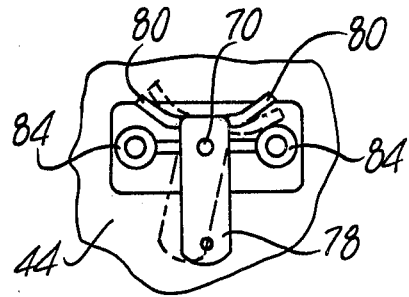
FIG. 4 is a fragmentary view illustrating a portion of the recording device of the present invention.

Referring now to FIGS. 1, 3 and 4, a scribe arm shaft 70 is rotatably mounted in a bearing assembly 72 which is secured to the rear face 44 of the plate 34 and so that a portion 76 of the shaft extends outwardly from the front face 48 of the plate 34 through an aperture. A limit member 78 having a pair of upwardly protruding ears 80 is secured to the rear end of the shaft 70 by a set screw 82. The ears 80 cooperate with protruding bosses 84 on the bearing assembly 72 and limit the rotation of the shaft 70 between two pivotal positions as shown in phantom in FIG. 4 for a reason to be subsequently described.

Referring now particularly to FIGS. 1 and 3, an elongated scribe arm 86 is secured at one end to the outwardly extending portion 76 of the shaft 70 by a set screw 88. The scribe arm 86 further includes an elongated spring member 90. The spring member 90 extends through a portion 92 of a writing implement 94 having a writing tip 96 and the spring member 90 is biased so as to urge the writing tip 96 against the paper sheet 60. As illustrated, the writing implement 94 is a so-called felt tip pen although any conventional writing implement could alternatively be used. In addition, the limiting member 78 (FIG. 4) limits the pivotal action of the scribe arm 86 between an inner radial and outer radial position with respect to the circular sheet 60 and the scribe arm 86 is longitudinally dimensioned so that it sweeps substantially across the circular sheet 60.

Referring now particularly to FIGS. 1 and 6, an elongated actuating arm 100 is secured to the outwardly extending portion 46 of the shaft 40 by a set screw 102 so that the actuating arm 100 rotates in unison with the shaft 40 and thus in unison with the flow meter rotatable member 14. One end of the actuating arm 100 forms a pointer 104 which sweeps across an indicia plate 106 upon rotation of the shaft 40. Indicia plate 106 includes a scale indicative of the fluid flow rate through the flow meter 12 and both the pointer 104 and indicia plate 106 can be viewed through the window 30 on the front door 22. The actuating arm 100 also includes a portion 110 which extends radially outwardly from the shaft 40 opposite from the pointer 104 and has an elongated slot 112 formed through it.

Referring now to FIGS. 1, 3 and 6, an elongated connecting arm 114 is pivotally connected at one end 116 to the actuating arm 100 and along the slot 112. As best shown in FIG. 6, the pivotal connection between the connecting arm 114 and the slot 112 comprises a threaded member 118 which lockingly engages a nut 120. Moreover, the screw 118 and nut 120 can be adjustably secured to the actuating arm 100 along the slot 112 without interfering with the pivotal connection of the connecting arm 14.

As shown in FIG. 3, the other end 128 of the connecting arm 114 is similarly pivotally connected to the scribe arm 86 by a pivot pin 130 at a position radially spaced from the axis of rotation of the shaft 70.

In operation the actuating arm 100, connecting arm 114 and scribe arm 86 together form a linkage means so that the rotational position of the actuating arm shaft 40 in turn controls the pivotal position of the scribe arm 86. For example, when the actuating arm 100 is in a position indicating zero fluid flow through the flow meter, the connecting arm 114 pivots the scribe arm 86 toward its radially innermost position. Conversely, as the actuating arm 100 is rotated in a counterclockwise direction (as viewed in FIG. 1) to its maximum fluid flow rate, the actuating arm 100 pivots the scribe arm 86 to its radially outermost position via the connecting arm 114. Since the circular sheet 60 is continually rotatably driven by the motor 52, the writing implement 94 on the scribe arm 86 produces a chart on the circular sheet 60 indicative of the fluid flow rate through the flow meter over a period of time.

As best shown in FIGS. 1 and 5, a lifting member 140 is pivotally secured at 142 to the plate 34 and includes a portion 144 which extends underneath the writing implement 94 and the lifting member 140 is pivotaly between a lifting position (illustrated in phantom) and a nonlifting position (illustrated in solid line). In its lifting position, the portion 144 of the lifting lever 140 engages and picks the writing implement 94 up from the sheet 60, for example, when replacement of the writing sheet 60 is desired. When a new sheet 60 is installed over the motor shaft 54 in the previously described fashion, the lifting lever 140 is again returned to its lower or nonlifting position and the tip 96 of the writing implement 94 again contacts the writing sheet 60.

It can, therefore, be seen that the recording device 10 according to the present invention is advantageous in that it provides a written record of the flow rate through a flow meter over a predetermined period of time, for example, a one day period. Moreover, the entire recording device can be relatively inexpensively constructed and is virtually maintenance free in operation. In addition, since the rotational or pivotal movement of the flow meter rotatable member 14 varies from one flow meter to another, the longitudinal adjustment slot 112 in the actuating arm 100 insures that the scribe arm 86 can swing entirely radially across the circular sheet 60 for different rotational displacements of the actuating arm 100.

Having described my invention, however, many modifications thereto will become apparent to those skilled in the art to which it pertains without deviation from the spirit of the invention as defined by the scope of the appended claims.

I claim:

1. For use in conjunction with a fluid flow meter having a rotatable member the rotation of which is indicative of the fluid flow rate through the flow meter, a device for recording the flow meter flow rate over a period of time, said device comprising:

a housing;

a recording medium and means for substantially continuously moving said recording medium in a predetermined direction, said writing medium and said moving means being mounted in said housing;

an elongated scribe arm having a writing means secured to one end, said writing means engaging said writing medium and producing a visible mark thereon;

means for pivotally securing the other end of the scribe arm to the housing so that, as the scribe arm pivots, said writing means moves substantially transversely across said writing medium with respect to the direction of movement of the writing medium; and linkage means for connecting said flow meter rotatable member to said scribe arm so that said scribe arm pivots in unison with the rotation of said rotatable member, said linkage means including adjustment means for varying the proportion between the rotation of said rotatable member and the pivotal movement of said scribe arm.

2. The invention as defined in claim 1 and further comprising means for selectively holding said writing means in a position spaced from said recording medium.

3. The invention as defined in claim 1 and further comprising means for limiting the pivotal movement of said scribe arm between two rotational positions.

4. The invention as defined in claim 1 and further comprising an indicia scale positioned on said housing, wherein said linkage means including an actuating arm a portion of which swings across said indicia scale upon rotation of the rotatable member.

5. The invention as defined in claim 1 wherein said writing medium is circular in shape and wherein said moving means rotates said writing medium around its axis.

6. The invention as defined in claim 5 wherein said writing medium comprises a paper disc.

7. The invention as defined in claim 1 wherein said linkage means further comprises an actuating arm secured to and extending radially outwardly from the flow meter rotatable member and an elongated connecting arm pivotally secured at one end to said scribe arm at a point radially spaced from the pivotal connection of said scribe arm with said housing, and means for pivotally connecting the other end of the connecting arm to said actuating arm at a point radially spaced from the axis of rotation of the flow meter rotatable member.

8. The invention as defined in claim 7 wherein said adjustment means comprises means for adjusting the pivotal connection of said other end of said connecting arm longitudinally along said actuating arm.

9. The invention as defined in claim 1 and further comprising spring means for urging said writing means against said recording medium.

10. The invention as defined in claim 9 wherein said spring means further comprises an elongated spring band secured to and forming a part of the scribe arm, said writing means including a housing having a portion through which the spring band extends.

11. For use in conjunction with a fluid flow meter having a rotatable member the rotation of which is indicative of the fluid flow rate through the flow meter, a device for recording the flow meter flow rate over a period of time, said device comprising:

a housing;

a recording medium and means for substantially continuously moving said recording medium in a predetermined direction, said writing medium and said moving means being mounted in said housing;

an elongated scribe arm having a writing means secured to one end, said writing means engaging said writing medium and producing a visible mark thereon;

means for pivotally securing the other end of the scribe arm to the housing so that, as the scribe arm pivots, said writing means moves substantially transversely across said writing medium with respect to the direction of movement of the writing medium; and wherein said linkage means further comprises an actuating arm secured to and extending radially outwardly from the flow meter rotatable member and an elongated connecting arm pivotally secured at one end to said scribe arm at a point radially spaced from the pivotal connection of said scribe arm with said housing, and means for pivotally connecting the other end of the connecting arm to said actuating arm at a point radially spaced from the axis of rotation of the flow meter rotatable member.

* * * * *

UNITED STATES PATENT OFFICE
CERTIFICATE OF CORRECTION

Patent No. 4,307,405            Dated December 22, 1981

Inventor(s) Nils O. Rosaen

It is certified that error appears in the above-identified patent and that said Letters Patent are hereby corrected as shown below:

Column 3, line 62, after substantially, insert --radially-- therefor.

Signed and Sealed this

Sixteenth Day of March 1982

[SEAL]

Attest:

GERALD J. MOSSINGHOFF

Attesting Officer     Commissioner of Patents and Trademarks